United States Patent
Khan et al.

(10) Patent No.: US 6,625,683 B1
(45) Date of Patent: Sep. 23, 2003

(54) AUTOMATIC EARLY PCI TRANSACTION RETRY

(75) Inventors: Asif Q. Khan, Austin, TX (US); James O. Mergard, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/379,018

(22) Filed: Aug. 23, 1999

(51) Int. Cl.[7] ............................................... G06F 13/20
(52) U.S. Cl. ...................................... 710/313; 710/306
(58) Field of Search .................................. 710/107–125, 710/305–315

(56) References Cited

U.S. PATENT DOCUMENTS

| | | | |
|---|---|---|---|
| 5,764,929 A | * 6/1998 | Kelley et al. | 710/107 |
| 5,828,865 A | * 10/1998 | Bell | 395/500.48 |
| 5,832,241 A | * 11/1998 | Guy et al. | 710/112 |
| 5,870,567 A | * 2/1999 | Hausauer et al. | 710/101 |
| 5,878,237 A | * 3/1999 | Olarig | 710/128 |
| 5,884,027 A | * 3/1999 | Garbus et al. | 709/250 |
| 5,987,555 A | * 11/1999 | Alzien et al. | 710/129 |
| 6,075,929 A | * 6/2000 | MacLaren | 395/309 |
| 6,145,044 A | * 11/2000 | Ogura | 710/311 |
| 6,199,131 B1 | * 3/2001 | Melo et al. | 710/107 |
| 6,298,407 B1 | * 10/2001 | Davis et al. | 710/129 |
| 6,385,686 B1 | * 5/2002 | Brown | 710/313 |

OTHER PUBLICATIONS

PCI Local Bus Specification, Revision 2.1, Jun. 1, 1995, pp. 43–44 and 49–51.*
*PCI System Architecture*, Fourth Edition,© by MindShare, Inc., by Don Anderson and Tom Shanley, pp. 171 through 198.

* cited by examiner

*Primary Examiner*—Sumati Lefkowitz
(74) *Attorney, Agent, or Firm*—Akin Gump Strauss Hauer & Feld, LLP

(57) ABSTRACT

A bus bridge mechanism is provided with an automatic delayed transaction enable mode. When the automatic delayed transaction enable mode is activated, a bus master making a read request is immediately signaled to retry the transaction, and the read request is treated by the bus bridge as a delayed read request to be completed asynchronously. The delayed read request, when completed, supplies data to the bus master on the next retry of the read request by the bus master following the completion of the delayed read request.

13 Claims, 6 Drawing Sheets

AUTOMATIC EARLY PCI TRANSACTION RETRY

BACKGROUND OF THE INVENTION

1. Field of the Invention

The present invention generally relates to bus bridge architectures within processor-based systems, and more particularly to a bus bridge with a programmable early retry capability.

2. Description of the Related Art

A bus provides a mechanism for communication between components of a system or microcontroller. A bus is essentially a collection of wires through which data may be transmitted from one part of a system to another part of the system. In a computer system, for example, a bus connects internal components of the computer to the central processing unit, or CPU, and to main memory.

A system with more than one bus can have a bus bridge to connect a pair of busses together. A bus bridge allows a bus master on one bus to generate transactions to access devices connected to the other bus. For example, a PCI host bridge interface allows a CPU to generate PCI master transactions and allows external PCI bus masters to access memory connected to the CPU. In a conventional bus bridge, a bus master making a read request will control the bus until either the data is supplied to the bus master from the target device or a timeout occurs, at which point the bus master is signaled to retry the transaction and disconnects from the bus, freeing the bus so other transactions can occur. When the bus master next regains the bus, it will retry the read transaction. When the read transaction frequently cannot be completed within the timeout period, a retry capability can improve the latency (the time between a request to access the bus is made and obtaining access to the bus) of bus masters on the bus.

However, if the bus bridge delays signaling the bus master to retry the transaction, the bus remains controlled by the bus master between the time the bus master makes the read request and the time the bus bridge signals a retry cycle, even though other bus masters may have requested access to the bus. If the delay occurs infrequently, holding the bus during the delay period can be better for the bus as a whole than having the bus master give up the bus and retry the transaction. If the delay is frequent or long, however, the bus throughput can be degraded because of the time spent during the delay before the bus master is signaled to retry the transaction. This can occur when a bus master is attempting to access busy resources such as memory.

SUMMARY OF THE INVENTION

In a system according to the preferred embodiment, a bus bridge provides a mechanism for causing an external bus master to retry a transaction. The bus bridge is coupled to two busses and provides an automatic retry enable mode. If the automatic retry enable mode is activated, when the external bus master on one bus issues a read request, the bus bridge immediately issues a retry to the external bus master. In one embodiment, when the automatic retry enable mode is activated, the bus bridge treats the read request as a delayed read request and completes the delayed read request asynchronously, supplying data to the external bus master the next time the external bus master retries the read request to the bus bridge following completion of the delayed read request.

One advantage of this mechanism is that the efficiency of the bus is improved by freeing up the bus while the read request is handled by the bus bridge, rather than the bus master holding the bus for up to the maximum number of clocks, and then retrying the transaction when the bus bridge is unable to supply data to complete the read request.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following related to patent applications are hereby incorporated by reference as if set forth in their entirety:

U.S. patent application Ser. No. 09/378,985, bearing Attorney Docket No. A99121US, entitled NON-CONCURRENT MODE, now U.S. Pat. No. 6,163,826, filed concurrently;

U.S. patent application Ser. No. 09/379,456, bearing Attorney Docket No. A99112US, entitled FLEXIBLE PC/AT-COMPATIBLE MICROCONTROLLER, filed concurrently; and U.S. patent application Ser. No. 09/379,457, bearing Attorney Docket No. A99113US, entitled FLEXIBLE MICROCONTROLLER ARCHITECTURE, filed concurrently.

MICROCONTROLLER

Figure 1:
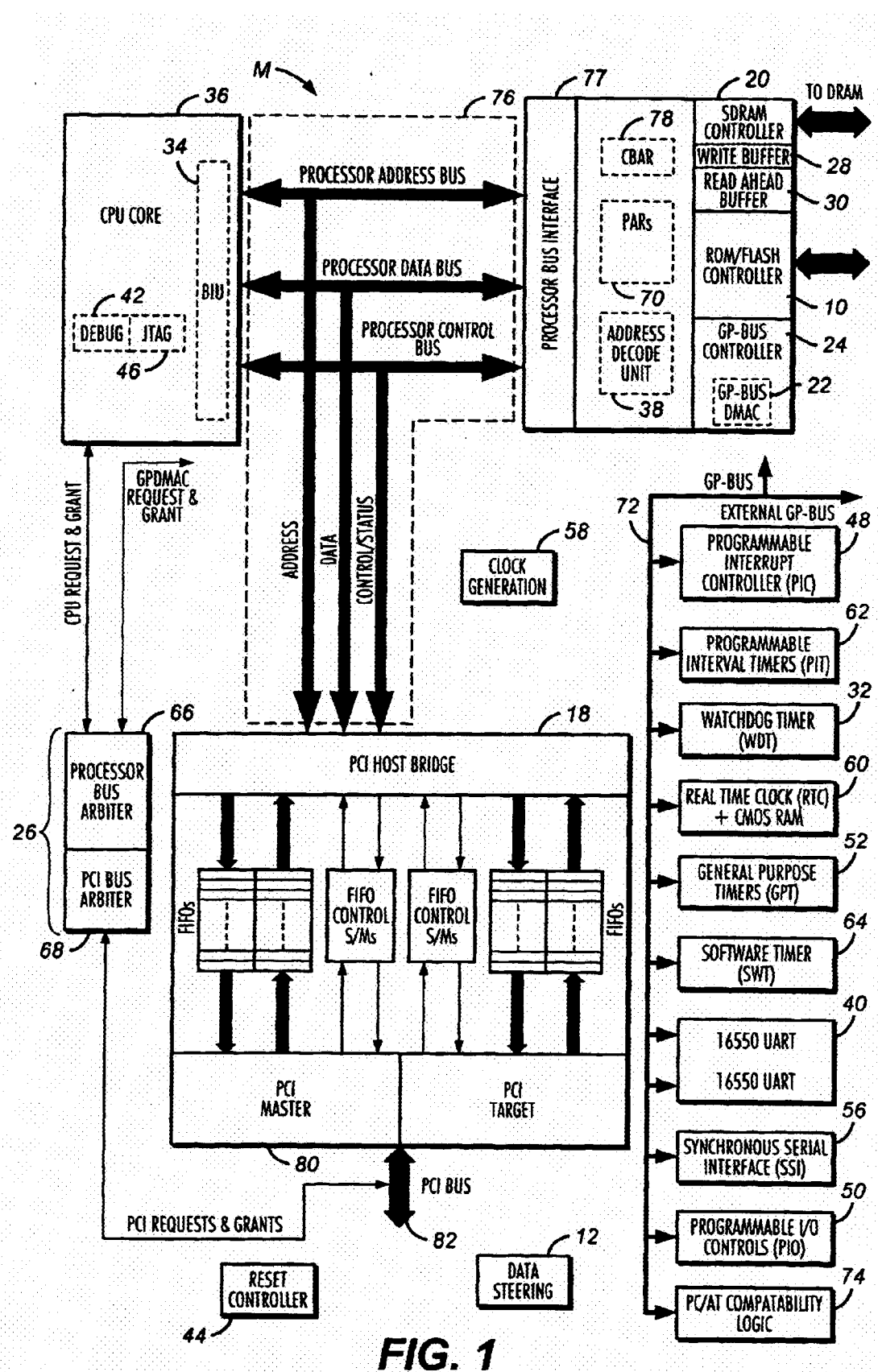
FIG. 1 is a block diagram of a microcontroller containing an embodiment of the present invention.

Turning now to the drawings, FIG. 1 shows a typical microcontroller M in accordance with the present invention. The microcontroller M provides a highly integrated CPU 36 with a complete set of peripherals that are a superset of common PC/AT peripherals and with a set of memory mapped peripherals. In the disclosed exemplary embodiment, the CPU 36 is the Am5x86 CPU core, which utilizes the industry standard x86 microprocessor instruction set. The CPU 36 includes an integrated 16K write back cache.

The microcontroller M provides Programmable Address Region (PAR) registers 70 that enable flexible placement of memory and peripherals into a memory address space and an I/O address space. The PAR registers 70 also allow control of important attributes like cacheability, write protection, and code execution control for memory resources. Both the PAR registers 70 and a Configuration Base Address register (CBAR) 78 serve as address decode registers. While the PAR registers 70 are memory-mapped, the CBAR 78 is direct-mapped to I/O.

An address decoding unit (ADU) 38 provides flexible distributed memory and I/O address decode logic. Address decode is distributed between a general purpose (GP)-Bus Controller 24, memory controllers such as a read-only memory (ROM) controller 10 and a dynamic random access memory (DRAM) controller 20, and a Peripheral Component Interconnect (PCI) bus 82. PC/AT-compatible peripherals are direct-mapped to I/O, and remaining integrated peripherals are memory-mapped. The memory space and I/O space of a general purpose bus 72 are accessible by the CPU 36, the PCI master controller 80, and external PCI bus masters. The memory space and I/O space of the PCI bus 82 are accessible by the CPU 36 and PCI masters 80.

A system arbiter 26 includes an arbiter 66 for performing arbitration for a processor bus 76 (shown divided into its address, data, and control portions) and an arbiter 68 for performing arbitration for the PCI Bus 82. The processor bus arbiter 66 may arbitrate between several possible processor bus masters. For example, the processor bus arbiter 66 may handle requests for the CPU 36, the general purpose bus DMA controller 22, and the PCI host bridge 18 on behalf of an external bus master requesting access to DRAM. The PCI bus arbiter 68 may arbitrate between five possible PCI masters.

A processor bus interface 77 is responsible for DMA cache snooping, dynamic clock speed adjusting, dynamic bus sizing, ready signal consolidation, Memory Mapped Configuration Region (MMCR) control, and general purpose address control. A Bus Interface Unit (BIU) 34 basically assists the CPU 36 with bus, DMA, and memory control.

A clocks module 58 provides oscillators and phase locked loops (PLLs) to support the DRAM controller 20, UARTs 40, general purpose timers (GPT) 52, and a real-time clock (RTC) 60.

The DRAM controller 20 provides SDRAM (synchronous DRAM) support, symmetric and asymmetrical DRAM support, SDRAM auto refresh support, SDRAM Error Correction Code (ECC) support, DRAM write buffering support, DRAM read pre-fetching support, read-around-write support, and support for up to 256 megabytes of external DRAM. The DRAM controller 20 may service requests from the CPU 36, the PCI host bridge 18 on behalf of an external PCI master, or the general purpose bus DMA controller and may issue commands to SDRAM devices. DRAM cycles may be also be initiated by a write buffer 28 or a read-ahead buffer 30 internal to the DRAM controller 20. The write buffer 28 and the read-ahead buffer 30 together provide buffering techniques to optimize DRAM system performance.

A data steering block 12 stores data and routes data as needed from 8/16-bit devices from/to the general purpose bus 72 to/from a CPU bus. On DMA SDRAM reads, the data steering block 12 may save data until the next address strobe.

A general purpose bus controller 24 controls the general purpose bus 72, an internal and external bus that connects 8- or 16-bit peripherals to the microcontroller M without glue logic. Features of the controller 24 include 8 external chip selects, programmable bus interface timing, "ready" signal support for external devices, and support for 8/16-bit I/O and memory mapped I/O cycles. In the disclosed embodiment, the general purpose bus 72 supports a programmable interrupt controller (PIC) 48, a programmable interval timer (PIT) 62, a watchdog timer (WDT) 32, the real-time clock (RTC) 60, the general purpose timers (GPT) 52, a software timer (SWT) 64, UARTs 40, a synchronous serial interface (SSI) 56, programmable I/O logic 50, and PC/AT compatibility logic 74.

The microcontroller M includes a DMA controller 22 (general purpose bus DMAC) on the general purpose bus 72. The controller 22 is shown integrated with the general purpose bus controller 24. The DMA controller 22 is designed to handle any DMA accesses between general purpose bus peripherals (internal or external) and DRAM. Features of the controller 22 includes support for up to 7 DMA request channels (with a maximum of 4 external requests), support for three 16-bit channels and four 8-bit channels, buffer chaining capability in enhanced mode, fly-by (single cycle) transfers between general purpose bus peripherals and DRAM, and variable clock modes. The controller 22 is PC/AT-compatible.

A PIO (programmable I/O) unit 50 provides PIO logic to support 32 programmable I/O signals (PIOs) to monitor signals and control devices not handled by other functions of the microcontroller M. The PIOs are shared with other functions on the microcontroller M.

A timers unit 52 provides general purpose timers for generic timing or counting applications. Features of the timers unit 52 include three 16-bit timers, two-stage cascading of timers, and several modes of operations.

An in-circuit emulator (ICE) core 42 provides an integrated debug interface for embedded hardware/software debug during a special debug mode, ICE mode. Controllability and observability may be achieved through a fast JTAG-compliant serial interface.

A PCI host bridge 18 is integrated into the microcontroller M which allows the CPU 36 to generate PCI master transactions and allows external PCI masters to access the microcontroller DRAM space. The PCI Host bridge 18 may be a 33 MHz, 32-bit PCI Bus Revision 2.2-compliant host bridge interface.

A PIC 48 includes 3 industry standard programmable interrupt controllers (PCIS) integrated together with a highly programmable interrupt router. Two of the PICs 48 may be cascaded as slaves to a master PIC which arbitrates interrupt requests from various sources to the CPU 36. The PICs 48 may be programmed to operate in PC/AT-compatible mode. The router may handle routing of 33 various external and internal interrupt sources to the 22 interrupt channels of the three PICs.

A programmable interval timer (PIT) 62, which is compatible to 8254 PIT circuitry, is provided. The PIT 62 provides three 16-bit general purpose programmable channels, six programmable counter modes, and binary and BCD counting support.

The microcontroller M further includes an integrated reset controller 44 to control the generation of soft or hard resets to the CPU 36 and system resets to the various internal cores. The reset controller 44 provides a control bit to enable ICE mode after the CPU 36 has been reset.

An integrated ROM/Flash controller 10 provides a glueless interface to up to three ROMs, EPROMs, or flash devices. It supports asynchronous and advanced page-mode devices.

The RTC block 60 is compatible with the Motorola MC 146818A device used in PC/AT systems. The RTC 60 supports binary or BCD representation of time, calendar, and alarm, its own power pin and reset, 14 bytes of clock and control registers, 114 bytes of general purpose RAM, three interrupts sources, battery backup capability, and an internal RTC reset signal to perform a reset at power-up.

A synchronous serial interface (SSI) 56 provides efficient full-duplex and half-duplex, bi-directional communications to peripheral devices. Other features include clock speed programmable from 64 KHz to 8 MHz and multiple device enables.

A software timer (SWT) 64 is a peripheral on the GP-Bus 72 which provides a millisecond time base with microsecond resolution timing for software. The peripheral 64 includes a 16-bit millisecond up counter and a 10-bit millisecond up counter.

A test controller block 46 includes test logic such as the JTAG controller. The test logic is provided to test and ensure that the components of the microcontroller M function correctly.

A UART block 40 includes two PC16550-compatible UARTs, both capable of running 16450 and 16550 software. The UART block 40 supports DMA operation, a FIFO mode, an internal baud rate clock to handle baud rates up to 1.5M bits/s, false start bit detection, break detection, full-duplex operation, and other features.

A watchdog timer block (WDT) 32 is a mechanism to allow system software to regain control of the microcontroller M when the software fails to behave as expected. The watchdog timer block 32 supports up to a 30-second time-out with a 33 MHz CPU clock.

The PC/AT compatibility logic 74 provides PC/AT-compatible functions. The PC/AT compatible integrated peripherals include the DMA controller 22, the PIT 48, the GPT 52, the UARTs 40, and the RTC 60.

This particular microcontroller is illustrative. The techniques and circuitry according to the invention could be applied to a wide variety of microcontrollers and other similar environments. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of the products, and generally means an execution unit with added functionality all implemented on a single monolithic integrated circuit.

Figure 2:
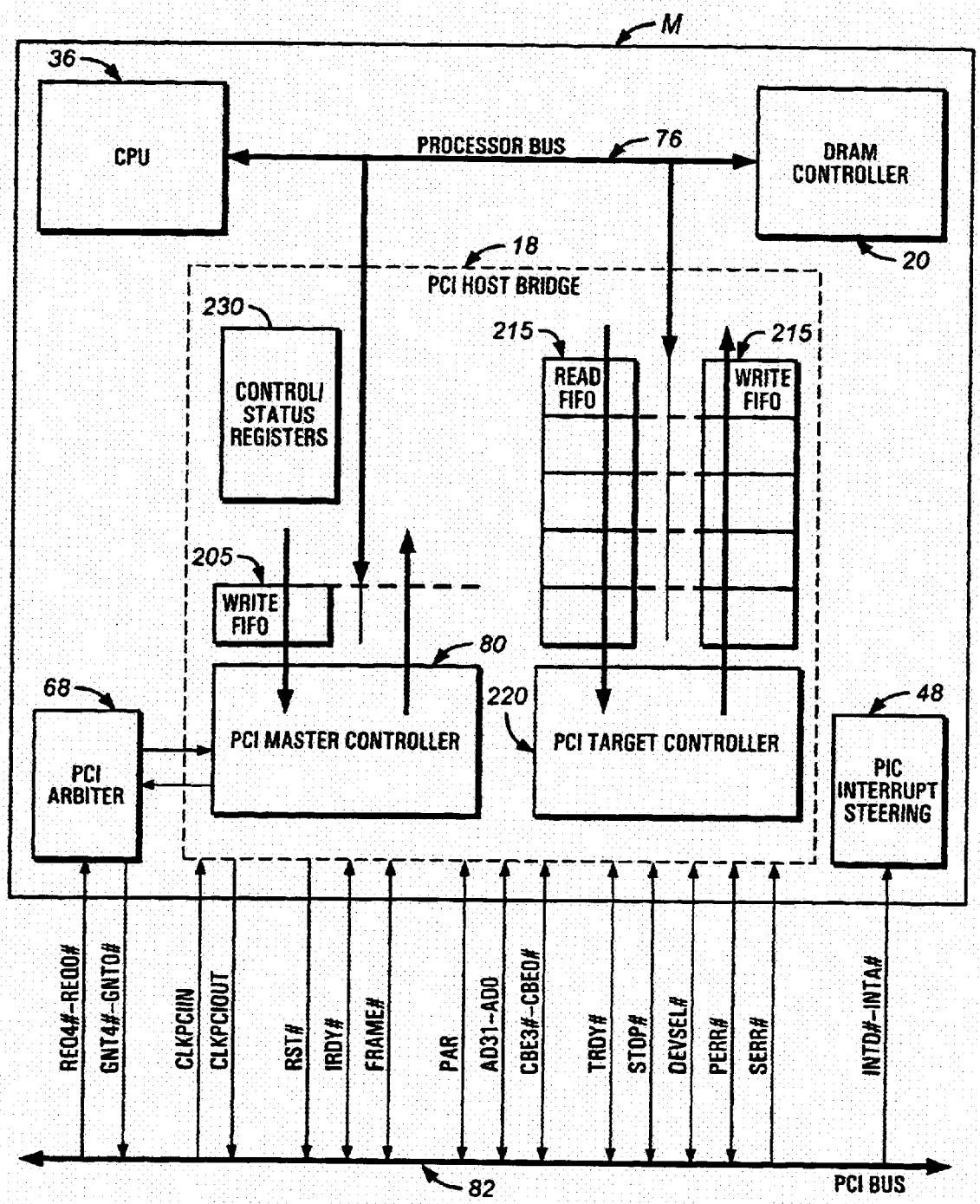
FIG. 2 is a block diagram of a host bridge for the microcontroller of FIG. 1.

Turning to FIG. 2, a block diagram of the microcontroller M focusing on the PCI host bridge 18 is shown. The processor bus 76 connects the CPU 36, the DRAM controller 20, and the PCI Host Bridge Controller 80. For the focus purposes of this diagram, the interface BIU 78 is omitted and the three signals of the processor bus 76 are shown as a single bus. The PCI host bridge controller 18 has a PCI master controller 80 and a PCI target controller 220. The PCI master controller 80 uses a write FIFO 205 to buffer data being written to the PCI bus 82. The PCI target controller 220 uses a read FIFO 215 and a write FIFO buffer 225 to buffer data being read from and written to the processor bus. Interrupt steering for the PCI bus is performed by the interrupt router of the programmable interrupt controller 48. The PCI bus arbiter 68 controls access to the PCI bus 82. When the microcontroller M is in non-concurrent mode, the PCI arbiter 68 and the processor bus arbiter 66 (FIG. 1) are linked so that an external PCI master must gain control of both the processor bus 76 and the PCI bus 82 before the external PCI bus master can access the PCI bus 82. Non-concurrent mode is described in more detail in a commonly assigned patent application, entitled "NON-CONCURRENT MODE," previously incorporated herein by reference.

The PCI bus signals are compliant with the PCI 2.2 specification and are shown using the standard convention that a signal name with a #-character following the name indicates a signal which is asserted at a logic low instead of at a logic high. For example, the initiator ready signal IRDY# is a signal which is asserted at logic low. One skilled in the art will recognize that other bus signals could be used without departing from the spirit of the invention. A set of memory-mapped PCI host bridge control/status registers 230 include an automatic delayed transaction enable bit, a delayed transaction time-out indicator, and various other status and configuration fields for controlling the PCI host bridge 18.

The PCI master controller 80 allows the CPU 36 to be a master on the PCI bus 82. The CPU 36 can generate configuration transactions to configure the PCI host bridge 18 as well as external devices on the PCI bus 82. The CPU 36 can also generate memory and I/O read and write transactions on the PCI bus.

The PCI target controller 220 allows up to five external PCI bus masters or initiators to access DRAM connected to the microcontroller M via the DRAM controller 20. One skilled in the art will recognize that other numbers of external PCI bus masters can be supported without departing from the spirit of the invention. The PCI host bridge 18 can generate both maskable and non-maskable interrupts. The PCI control/status registers 230 contain fields which can be programmed to specify what interrupts should be generated. Each interrupt source has an enable field and a select field. The enable field enables the interrupt source to generate an interrupt, and the select field selects whether the interrupt source will generate a non-maskable interrupt or a maskable interrupt. Each external PCI bus master has a pair of arbitration lines that connect it directly to the PCI bus arbiter 66. For example, external PCI bus master 0 uses signals REQ0# and GNT0#. When an external PCI bus master requires control of the PCI bus 82, it asserts its own REQ# line to the PCI arbiter 68. When the PCI arbiter 68 has determined that the external PCI bus master should be granted control of the PCI bus 82, it asserts the GNT# (grant) line specific to the external PCI bus master. In the PCI environment, bus arbitration can take place while another external PCI bus master is still in control of the PCI bus 82. When an external PCI bus master receives a grant from the PCI arbiter 68, it must wait for the current initiator to complete its transfer before initiating its own transfer. The external PCI bus master cannot assume ownership of the PCI bus 82 until FRAME# is sampled deasserted (indicating the start of the last data phase) and IRDY# is then sampled deasserted (indicating the completion of the last data phase), indicating that the current transaction has been completed and the PCI bus 82 has been returned to the idle state. PCI bus arbitration is discussed in more detail in the commonly assigned application entitled "NON-CONCURRENT MODE," previously incorporated by reference.

The CLKPCIOUT and CLKPCIIN signals are used to provide the CLK signal, which provides timing for all transactions on the PCI bus 82. The CLKPCIOUT output signal will drive a 33 MHz clock that is used as the system PCI bus clock, but the PCI host bridge 18 will be clocked from the CLKPCIIN input signal. The CLKPCIIN input signal is intended to be connected to the CLKPCIOUT output signal to guarantee that the PCI host bridge controller 80 will be driven with the same clock as the external PCI bus devices, otherwise external buffering and loading of the CLKPCIOUT pin could delay the clock so that the skew between the PCI host bridge 18 and external PCI bus devices would not meet the PCI bus specification. External buffering the CLKPCIOUT signal may or may not be desirable depending upon the system loading. An external PCI bus master receives the CLKPCIOUT signal as its PCI CLK signal. The PCI host bridge 18 receives CLKPCIIN as its CLK signal. Other implementations of the CLK signal are possible without departing from the spirit of the invention. In particular other clock speeds could be used without departing from the spirit of the invention.

When asserted, the reset signal (RST#) forces all PCI configuration registers and the master and target controllers 80 and 220 to an initialized state. RST# may be asserted or deasserted asynchronously to the PCI CLK edge. The assertion of RST# also initializes other PCI device specific functions. The PCI master controller 80 and the PCI host bridge target controller 220 will go to their idle states and the PCI host bridge FIFOs 205, 215, and 225 will be purged.

Initiator ready (IRDY#) is driven by the current bus master (the initiator of the transaction), which may be either the PCI host bridge 18 or an external PCI bus master. During a write, IRDY# asserted indicates that the initiator is driving valid data onto the data bus (signals AD31–AD0). During a read, IRDY# asserted indicates that the initiator is ready to accept data from the currently-addressed target. In order to determine that bus ownership has been acquired, the bus master must sample FRAME# and IRDY# both deasserted and the appropriate GNT# signal asserted on the same rising-edge of the PCI CLK signal.

Cycle frame (FRAME#) is driven by the current initiator and indicates the start (when it is first asserted) and duration (the duration of its assertion) of a PCI bus transaction. In order to determine that bus ownership has been acquired, the master must sample FRAME# and IRDY# both deasserted and GNT# asserted on the same rising edge of the PCI CLK signal. A transaction may consist of one or more data transfers between the current initiator and the currently-addressed target. FRAME# is deasserted when the initiator is ready to complete the final data phase.

The parity signal, PAR, is driven by the initiator one clock after completion of the address phase or one clock after assertion of IRDY# during each data phase of write transactions. It is driven by the currently-addressed target one clock after the assertion of TRDY# during each data phase of read transactions. One clock after completion of the address phase, the initiator drives PAR either high or low to ensure even parity across the address bus, AD31–AD0, and the four command byte enable lines, CBE3#–CBE0#.

The AD bus signals AD31–AD0, carries the start address and data to be transferred. The resolution of the start address is on a double word (DWORD) boundary (address divisible by four) during a memory or a configuration transaction, or a byte-specific address during an I/O read or write transaction.

The command or byte enable bus, CBE3#–CBE0#, defines the type of transaction. A PCI transaction may be one of interrupt acknowledge, special cycle, I/O read, 110 write, memory read, memory write, configuration read, configuration write, memory ready multiple, dual address cycle, memory read the line, or memory write-and-invalidate. One skilled in the art will recognize that other transactions could be defined without departing from the spirit of the invention. In addition, these signals are driven by the initiator to indicate the bytes to be transferred within the currently addressed DWORD and the data paths (the AD bus signals) to be used to transfer the data.

The target ready (TRDY#) signal is driven by the currently-addressed PCI bus target. It is asserted when the target is ready to complete the current data phase (data transfer). A data phase is completed when the target is asserting TRDY# and the initiator is asserting IRDY# at the rising-edge of the CLK signal. During a read, TRDY# asserted indicates that the target is driving valid data onto the data bus. During a write, TRDY# asserted indicates that the target is ready to accept data from the master. Wait states are inserted into the current data phase until both TRDY# and IRDY# are sampled asserted.

A target asserts the STOP# signal to indicate that it wishes the initiator to stop the transaction in progress.

The device select (DEVSEL#) signal is asserted by a target when the target has decoded its address. It acts as an input to the current initiator. If a master initiates a transfer and does not detect DEVSEL# active within four clock cycles, it must assume that the target cannot respond or that the address is unpopulated (i.e., no device exists using that address ). The master will then abort the transaction.

The data parity error signal, PERR#, indicates a parity error. The system error signal, SERR#, may be pulsed by any PCI device to report address parity errors, data parity errors during a special cycle, and critical errors other than parity. This signal is considered a "last-recourse" for reporting serious errors. A parity error detected by the PCI host bridge 18 will assert the PERR# signal to all external PCI bus masters. Any PCI bus master which detects a system error will assert the SERR# signal to the PCI host bridge 18. The optional PCI bus master device interrupt signals INTD#–INTA# will signal interrupts to the interrupt steering portion of the programmable interrupt controller 48 as configured by the control/status registers 230.

In the disclosed embodiment, the PCI host bridge 18 is internally structured into multiple logic sections or modules for programming convenience, but one skilled in the art will recognize that numerous logic structures and mechanisms could be provided without departing from the spirit of the invention.

Figure 3:
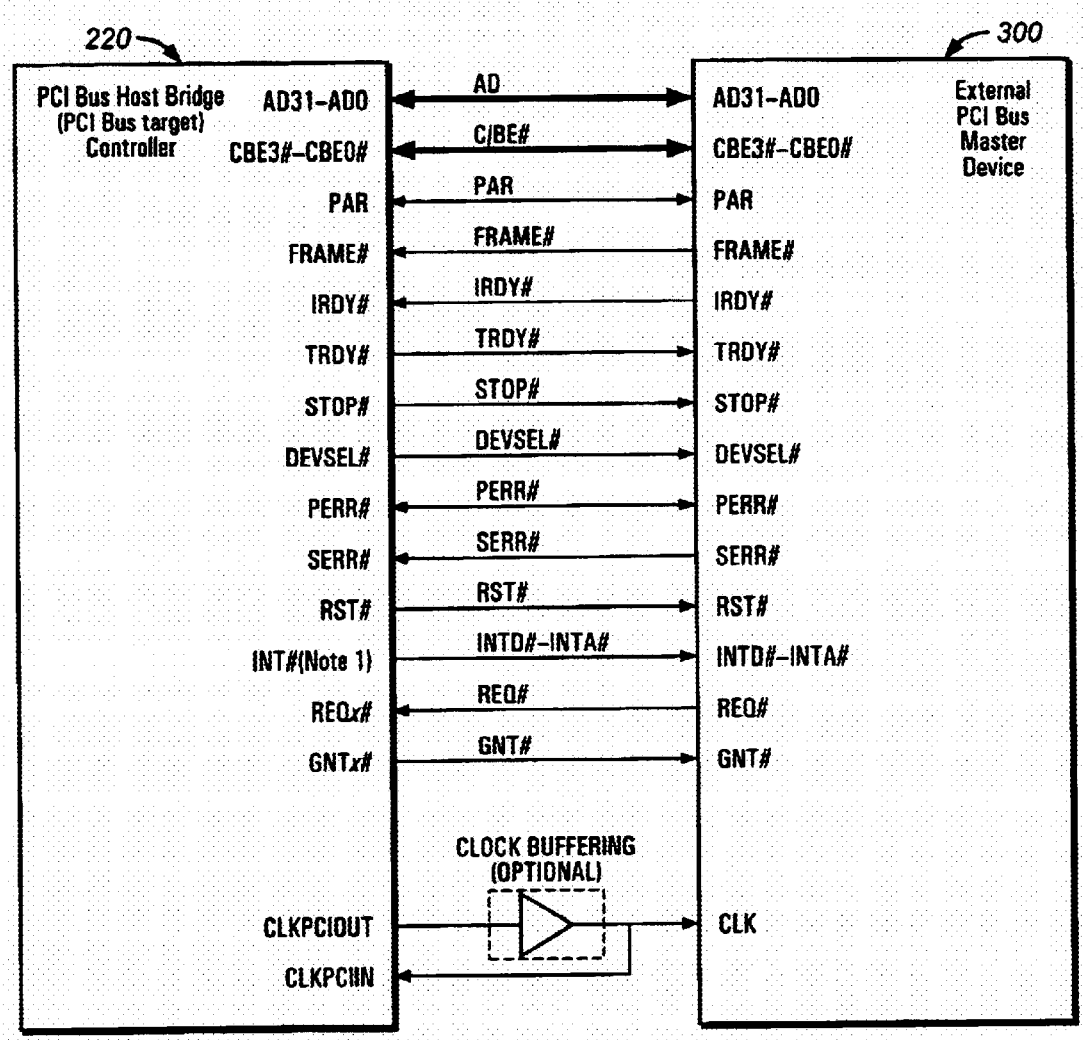
FIG. 3 is a block diagram of the signals between the host bridge of FIG. 2 and an external PCI bus master.

Turning to FIG. 3, the signaling between the PCI host bridge 18 and an external PCI bus master 300 is shown. The directional arrows indicate which of the PCI host bridge 18, the PCI arbiter 68, or the PCI bus master 300 generates the signal. As indicated, the PCI host bridge 18 will generate the AD31–AD0, CBE3#–CBE0#, PAR, TRDY#, STOP#, DEVSEL#, PERR#, RST#, and CLK signals. Depending on which of the five possible external PCI bus masters the external bus master 300 is configured to be, the PCI arbiter 68 will generate signals GNT4#–GNT0#. The external PCI bus master 300 will generate signals AD31–AD0, CBE3#–CBE0#, PAR, FRAMES, IRDY#, PERR#, SERR#, INTD#–INTA#, and REQ#. Depending on which of the five possible external PCI bus masters the external bus master 300 is configured to be, external bus master 300 will generate signal REQ4#–REQ0#. As shown in FIG. 3, clock buffering is optional and will depend upon the number and loading of the external PCI bus master 300 devices attached to the PCI bus 82.

There are two participants in every PCI transfer: the initiator and the target. The initiator, or bus master, is the device that initiates a transfer. The terms bus master and initiator can be used interchangeably and frequently are in the PCI specification. The target is the device currently addressed by the initiator for the purpose of performing a data transfer. In the disclosed embodiment, the PCI host bridge 18's target controller 220 is a target, and an external bus master 300 is a master or initiator.

As noted in FIG. 3, the INTD#–INTA# signals can be connected to the microcontroller M through the interrupt steering section of the programmable interrupt controller 48 on either the INTD#–INTA# pins or the general purpose interrupt pins GPIRQ10–GPIRQ0. These optional PCI interrupt signals can be used by a multifunction device to allow multiple functions to generate different interrupts.

External PCI bus master 300 reads from DRAM connected to the microcontroller M can be configured to be delayed transactions. This maximizes PCI bus efficiency by freeing up the PCI bus 82 while the initial DRAM read request is issued to the DRAM controller 20. When the automatic delayed transaction enabled field is set in the host bridge control/status register, 230, the PCI host bridge 18 will immediately issue a retry to the external PCI bus master read cycle, and will begin requesting the data from the DRAM controller 20. The external PCI bus master read cycle will be retried until any of the requested data has been read into the read-ahead FIFO 215. Only the first DWORD requested needs to be read in to the read-ahead FIFO 215 before the PCI host bridge 18 will complete the delayed transaction instead of retrying it again. After the PCI host bridge 18 responds to the delayed transaction, it will continue to pre-fetch data and will provide all the data requested (up to 64 DWORDs maximum) by the external PCI bus master 300 without disconnecting.

Figure 4:
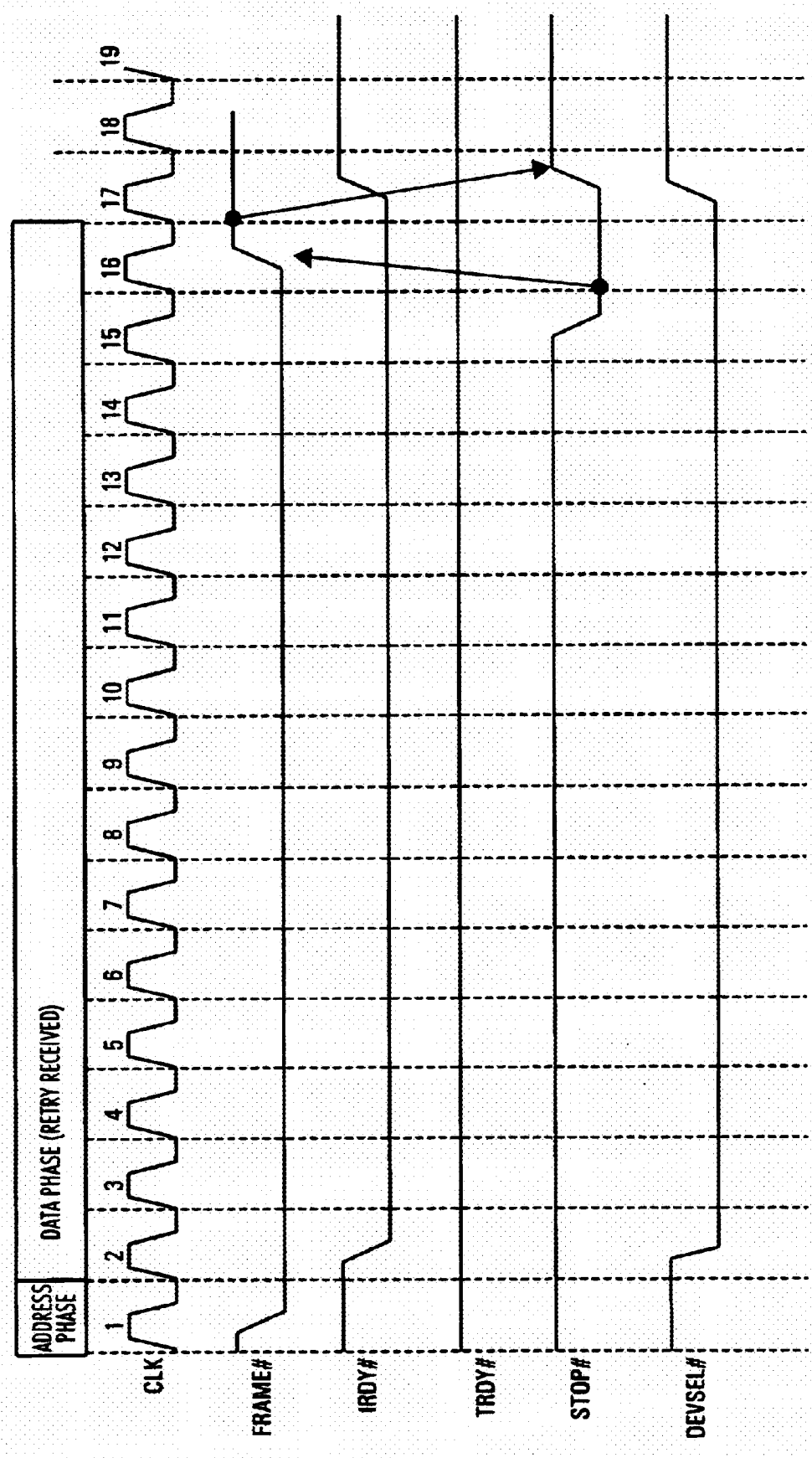
FIG. 4 is a timing diagram of a conventional retried PCI transaction performed on the host bridge of FIG. 2.

Turning to FIG. 4, a timing diagram of a conventional PCI transaction that ends in a retry is shown. According to the PCI specification, signals are sampled on the rising edge of the CLK clock. Thus in clock 1 signals FRAME#, IRDY#, TRDY#, STOP#, and DEVSEL# are all deasserted. During clock 1 the external PCI bus master 300 asserts FRAME# by driving it to a logic low state, indicating the start of a transaction. In clock 2 the initiator asserts IRDY# to indicate that it is ready to transfer data, and the PCI target controller 220 asserts DEVSEL# to indicate that it has decoded the address sent by the external PCI master 300. Because the PCI target controller 220 is unable to return data to the external bus master 300 immediately, it does not assert TRDY#. This state continues until clock 15, at which point the PCI target controller 220 indicates to the external bus master 300 to retry the transaction by asserting STOP#. During clocks 3–14, external PCI bus master 300 remains in control of the PCI bus 82, preventing other PCI masters from gaining control of the bus to transfer data. When external bus master 300 receives the retry from the target (on the rising-edge of clock 16), the initiator responds by keeping IRDY# asserted (in clock 16) and deasserting FRAME#. One clock later it deasserts IRDY# to return the bus to the idle state. The PCI target controller 220 then deasserts STOP# and DEVSEL#. The PCI specification allows a host bridge to wait for 32 clock periods before signaling a retry to the external bus master 300. During this time no other bus master may gain control of the bus. In a situation where the PCI host bridge 18 is frequently unable to respond within the thirty-two clock periods, such as when the DRAM controller 20 is busy, this can decrease the performance of the PCI bus 82.

Figure 5:
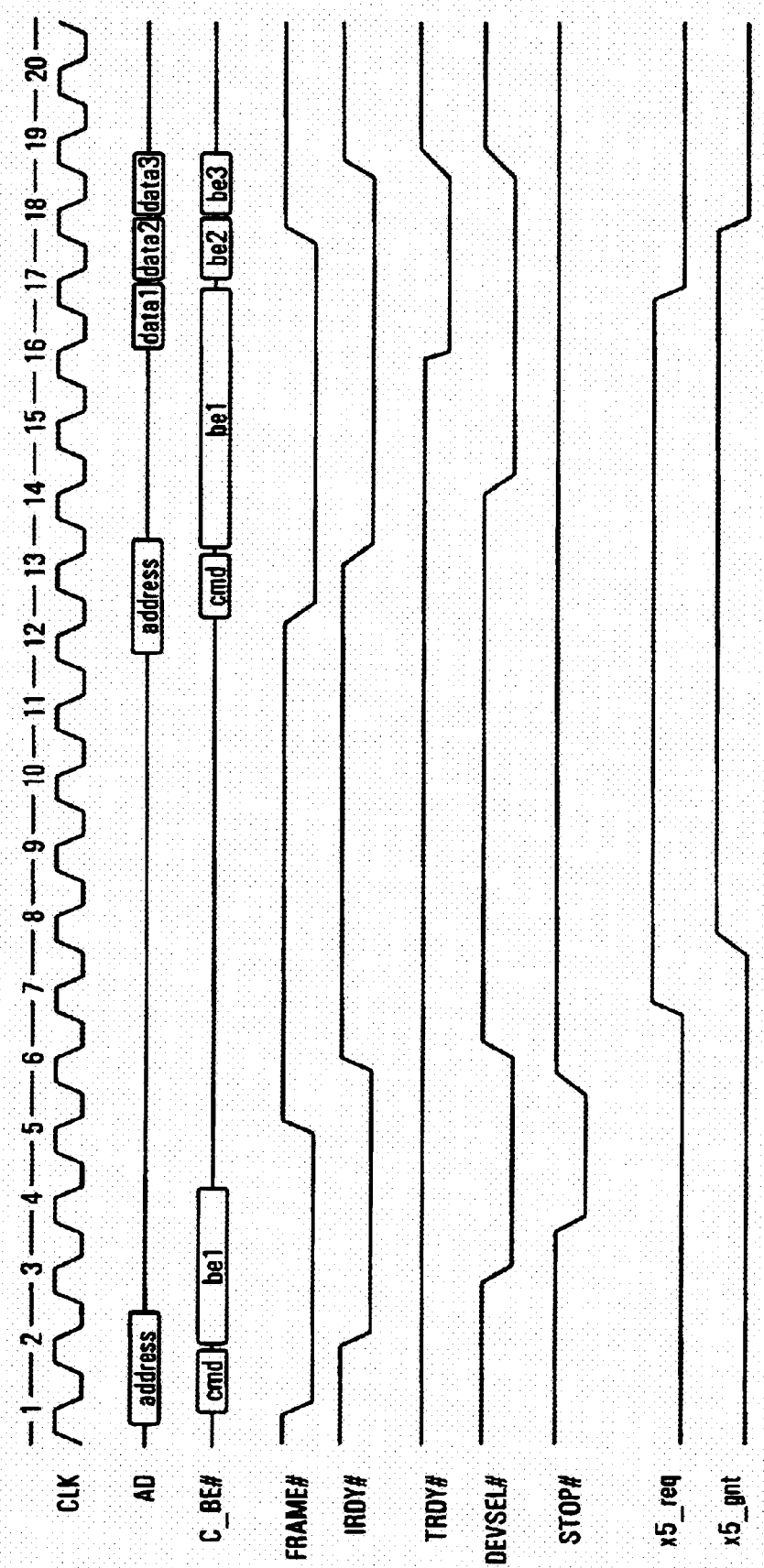
FIG. 5 is a timing diagram of an external PCI bus master DRAM read which results in a delayed transaction performed on the host bridge of FIG. 2.

FIG. 5 describes a external PCI master DRAM read transaction when the automatic delayed transaction enable mode has been activated according to one embodiment. One skilled in the art will recognize that I/O read and I/O write transactions can be handled similarly without departing from the spirit of the invention.

In clock 1 an external PCI bus master 300 initiates a read transaction to the DRAM connected to microcontroller M.

In clock 3, the host bridge target controller 80 accepts the transaction by asserting DEVSEL#. TRDY# is not asserted because there is no data in the read-ahead FIFO 215 (this is a new transaction).

In clock 4, the PCI target controller 220 asserts STOP#, signaling a retry to the external PCI bus master 300. Note that this assertion occurs before the normally requisite 16 clock cycle timeout has occurred. Because no data was transferred, the external PCI bus master 300 is required to retry the transaction. The PCI target controller 220 latches the transaction information and will pre-fetch the requested read data. This is now a delayed transaction and the external PCI bus master 300 is required to relinquish bus ownership and re-arbitration occurs to retry the cycle. If there is already a previously delayed transaction pending, the current transaction will not be latched. Note that in this example STOP# is asserted for two clock periods because a target is required to keep this signal asserted until FRAME# is deasserted.

In clock 7, the PCI host bridge 18 has synchronized the delayed transaction request and requests access to the DRAM controller by asserting the x5_req signal on the processor bus 76 so that the PCI target controller 220 can pre-fetch the data requested by the external PCI master 300.

In clock 8, the processor bus 76 is granted to the PCI host bridge 18 as indicated by the assertion of the x5_gnt signal and the requested data can be read from DRAM 20. The x5_gnt signal may be delayed if the CPU 36 or the GP bus DMAC 22 (FIG. 1) is accessing DRAM. The host bridge will pre-fetch up to the next cache line in response to a memory read or memory read line command, and up to 64 DWORDs in response to a memory read multiple command. At clock 12, the external PCI bus master 300 retries the delayed transaction. While a delayed transaction is pending all other read transactions will be retried by the PCI target controller 220, but they will not be latched as delayed transactions. Write transactions, however, will be allowed to complete and posted data will be put into the write FIFO 225. If the external PCI bus master 300 retries the delayed transaction before the host bridge has read the first DWORD of data into the read-ahead FIFO 215, the PCI target controller 220 will issue another retry to the external PCI bus master 300 and keep retrying the delayed transaction until the first DWORD of the data has been read into the read-ahead FIFO 215.

Clock 14 shows that the PCI target controller 220 has read in the first DWORD of data into the read-ahead FIFO 215 and recognizes this transaction is the pending delayed transaction. The PCI target controller 220 asserts DEVSEL# to claim the transaction. The PCI target controller 220 inserts two wait states before the first data phase by waiting to assert TRDY#. In clock 16, the PCI target controller 220 finally asserts TRDY# for the first data phase of the transaction.

In clock 17–19 the external PCI master 300 reads the data from the PCI target controller 220. The external PCI bus master 300 can insert wait states into the transaction by deasserting IRDY#. In clock 18 the external PCI bus master 300 deasserts FRAME# to indicate that it is about to transfer the last data phase. Clock 19 is the last data requested by the external PCI bus master 300, so the external bus master 300 asserts IRDY#. Likewise the PCI target controller 220 deasserts TRDY# and DEVSEL#.

In clock 17, the PCI target controller 220 indicates that it is finished with the processor bus 76 by deasserting the x5_reg signal which is followed in clock 18 by the deassertion of the x5_gnt signal by the processor bus arbiter 66. When IRDY# is deasserted in clock 19, both the PCI bus 82 and the processor bus 76 are idle.

Thus, by immediately terminating the transaction by asserting STOP# to force a retry and issuing an x5_req to the CPU 36, the PCI target controller 220 allows the PCI bus 82 to be used for other transactions.

When a delayed transaction read cycle is pending (waiting for the originating external PCI bus master 300 to retry the transaction) all other read transactions by an external PCI bus master will be terminated with a retry. One skilled in the art will recognize that the PCI specification allows a PCI host bridge 18 to handle multiple read transactions as delayed transactions without departing from the spirit of the invention. In one embodiment the PCI host bridge 18 supports one outstanding delayed transaction, so additional retried transactions will not be latched as delayed transactions. Write transactions, however will be allowed to complete and will be placed in the PCI host bridge target controller 220's write FIFO 225 in order to follow the PCI specification ordering rules. A delayed transaction discard timer is implemented by the PCI host bridge 18 so that a broken master will not deadlock the system. If after $2^{15}$ PCI clocks a master has not retried a delayed transaction, the transaction will be discarded by the PCI target controller 220, the delayed transaction timeout indicator will be set in the PCI host bridge status/control registers 230, and an interrupt can be optionally generated. One skilled in the art will recognize that other mechanisms for recognizing and handling broken masters can be implemented without departing from the spirit of the invention.

As shown in FIG. 4, when the automatic delayed transaction enable mode is not activated, external PCI bus master 300 read requests to microcontroller M's DRAM will not automatically cause a retry to be issued. The PCI target controller 220 will attempt to return the requested data to the external PCI bus master 300 without issuing a retry. Wait states will be inserted into the transaction until the data is read from the DRAM. If the initial data cannot be returned in 32 clocks, the PCI target controller 220 will terminate the transaction with a retry and latch the read transaction as a delayed transaction to comply with the PCI bus 2.2 specification. Note any data in the PCI master write FIFO 205 must be flushed before read data can be returned to an external PCI master 300 by the PCI target controller 280 because of PCI ordering rules. In this case the PCI target controller 220 will immediately retry the external PCI bus master 300 read transaction and latch the request as a delayed transaction even though the automatic delayed transaction enable mode is not activated.

Figure 6:
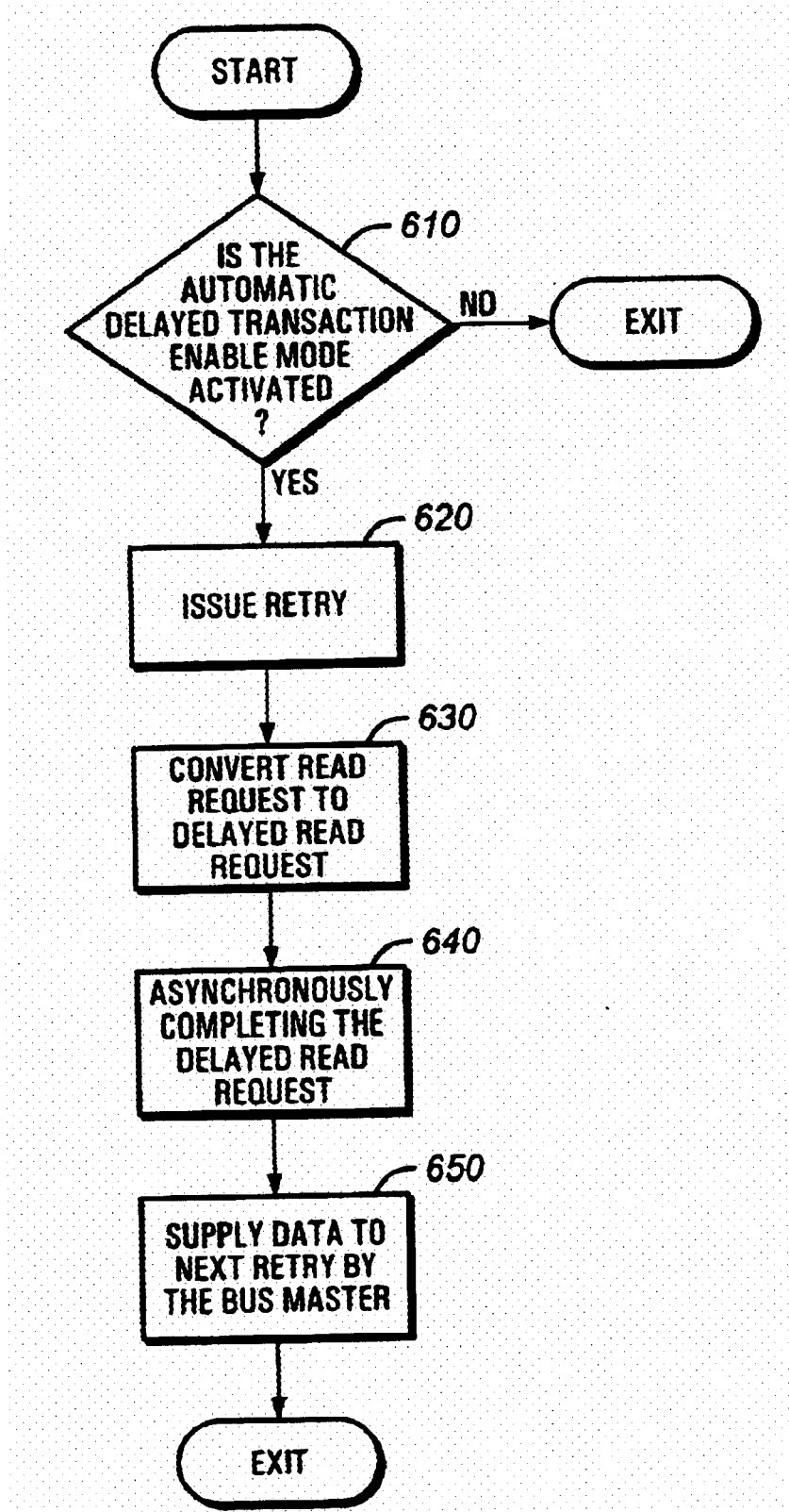
FIG. 6 is a flowchart of a method of automatically causing the host bridge of FIG. 2 to signal a retry to an external PCI bus master DRAM read and handle the read request as a delayed transaction.

Turning to FIG. 6, a method of automatically causing the PCI host bridge 18 to signal an external bus master 300 to retry a read transaction is shown. When the PCI host bridge 18 receives a read request from an external PCI bus master 300 in step 610, the PCI host bridge 18 determines whether the automatic delayed transaction enable mode is activated. If the automatic delayed transaction enable mode is deactivated, then the PCI host bridge 18 handles the read request as a normal read request. If the automatic delayed transaction enable mode is activated, then the PCI target controller 220 signals the external PCI bus master 300 to retry the read request in step 620. In step 630, the PCI target controller 220 converts the read request to a delayed read request. Asynchronously to other transactions on the bus, in step 640 PCI target controller 220 completes the delayed read request, holding data in the read-ahead FIFO 215. The next time the external bus master 300 retries the read request, in step 650 the PCI target controller 220 supplies data from the read-ahead FIFO 215 to the external bus master 300. In this fashion, the PCI host bridge 18 allows other external bus masters to access the PCI bus 82 while the PCI target controller 220 is attempting to complete the delayed read request.

One skilled in the art will recognize the foregoing method is illustrative and exemplary, and the various changes in the method of operation may be made without departing from the spirit of the invention.

The foregoing disclosure and description of the invention are illustrative and exemplary thereof, and various changes in the illustrated mechanism and construction and method of operation may be made without departing from the spirit of the invention.

We claim:

1. A bus bridge mechanism adapted to cause a bus master to retry a transaction comprising:

a first bus;

a second bus; and a bus bridge coupled to the first bus and the second bus comprising: an automatic delayed transaction enable mode, wherein, when a external bus master on the first bus issues a read request to a device on the second bus, if the automatic delayed transaction enable mode is activated, the bus bridge signals the external bus master to immediately retry the read request, otherwise, the bus bridge signals the external bus master to retry the read request after a standard timeout period has elapsed.

2. A bus bridge mechanism as in claim 1, wherein if the automatic delayed transaction enable mode is activated, the bus bridge treats the read request as a delayed read request, and wherein when the delayed read request completes, the bus bridge supplies data to the external bus master the next time the external bus master retries the read request to the bus bridge.

3. A bus bridge mechanism as in claim 1, wherein the read request is a memory read request.

4. A bus bridge mechanism as in claim 1, wherein the first bus is a Peripheral Component Interconnect (PCI) bus.

5. A bus bridge mechanism as in claim 1, wherein the second bus is a host bus.

6. A bus bridge mechanism as in claim 1, wherein the second bus is a PCI bus.

7. A microcontroller comprising:

a processor;

a host bus coupled to the processor;

a peripheral bus; and a peripheral bus host bridge coupled to the host bus and the peripheral bus, comprising:

an automatic delayed transaction enable mode, wherein, when a external bus master on the peripheral bus issues a read request to a device on the host bus, if the automatic delayed transaction enable mode is activated, the peripheral bus bridge signals to the external bus master to immediately retry the read request, otherwise, the peripheral bus bridge signals the external bus master to retry the read request after a standard timeout period has elapsed.

8. A microcontroller as in claim 7, wherein if the automatic delayed transaction enable mode is activated, the peripheral bus host bridge treats the read request as a delayed read request which completes asynchronously, and wherein when the delayed read request completes, the peripheral bus host bridge supplies data to the external bus master the next time the external bus master retries the read request to the peripheral bus host bridge.

9. A microcontroller as in claim 7, wherein the read request is a memory read request.

10. A microcontroller as in claim 7, wherein the peripheral bus is a PCI bus.

11. A method of automatically causing a bus bridge coupled to a first bus and a second bus to signal an external bus master to retry a read request, comprising the steps of:

detecting an automatic delayed transaction enable; and immediately issuing a retry to a read request by an external bus master on the first bus to a target on the second bus in response to detecting the automatic delayed transaction enable, otherwise, issuing a retry to the read request after a standard timeout period has elapsed.

12. A method as in claim 11, further comprising the steps of:

converting the read request into a delayed read request in response to issuing the retry; and asynchronously completing the delayed read request;

supplying data to the external peripheral bus master on the next retry by the external bus master following completion of the delayed read request.

13. A method as in claim 11, wherein the read request is a memory read request.

* * * * *